United States Patent
Sawal et al.

(10) Patent No.: US 9,348,773 B2
(45) Date of Patent: May 24, 2016

(54) SYSTEMS AND METHODS FOR ADAPTIVE INTERRUPT COALESCING IN A CONVERGED NETWORK

(71) Applicant: Dell Products L.P., Round Rock, TX (US)

(72) Inventors: Vinay Sawal, Fremont, CA (US); Vivek Dharmadhikari, San Jose, CA (US); Swaminathan Sundararaman, Cupertino, CA (US)

(73) Assignee: Dell Products, L.P., Round Rock, TX (US)

( * ) Notice: Subject to any disclaimer, the term of this patent is extended or adjusted under 35 U.S.C. 154(b) by 376 days.

(21) Appl. No.: 13/903,317

(22) Filed: May 28, 2013

(65) Prior Publication Data

US 2014/0359185 A1    Dec. 4, 2014

(51) Int. Cl.
*G06F 13/24* (2006.01)
*G06F 13/12* (2006.01)

(52) U.S. Cl.
CPC .............. *G06F 13/128* (2013.01); *G06F 13/24* (2013.01)

(58) Field of Classification Search
CPC ............................... G06F 13/128; G06F 13/24
USPC ................................................... 710/260, 264
See application file for complete search history.

(56) References Cited

U.S. PATENT DOCUMENTS

| | | | |
|---|---|---|---|
| 5,440,690 A * | 8/1995 | Rege et al. | 709/250 |
| 8,103,788 B1 | 1/2012 | Miranda | |
| 2002/0188749 A1 * | 12/2002 | Gaur | 709/234 |
| 2003/0200368 A1 * | 10/2003 | Musumeci | 710/260 |
| 2003/0200369 A1 | 10/2003 | Musumeci | |
| 2006/0075480 A1 | 4/2006 | Noehring et al. | |
| 2008/0077724 A1 * | 3/2008 | Sarangam et al. | 710/264 |
| 2009/0198483 A1 | 8/2009 | Uysal | |
| 2009/0276771 A1 | 11/2009 | Nickolov et al. | |
| 2010/0017441 A1 | 1/2010 | Todd | |
| 2010/0046859 A1 | 2/2010 | Hitomi et al. | |
| 2012/0250682 A1 | 10/2012 | Vincent et al. | |
| 2013/0111077 A1 | 5/2013 | Gowravaram et al. | |
| 2014/0195708 A1 * | 7/2014 | Klein et al. | 710/263 |

OTHER PUBLICATIONS

International Search Report and Written Opinion for PCT/US2013/067471 dated May 1, 2014, 18 pages.

* cited by examiner

*Primary Examiner* — Glenn A Auve

(74) *Attorney, Agent, or Firm* — Haynes & Boone, LLP

(57) ABSTRACT

An information handling system is provided. The information handling system includes an information handling device having one or more processors in communication with a network interface card. The network interface card includes one or more interfaces for receiving frames the information handling device is coupled to an external network device. The device also includes a memory that is in communication with the one or more processors and stores a classification matrix. The classification matrix is used to generate a current interrupt throttling rate from a plurality of candidate interrupt throttling rates that are applied to the received frames according to at least two properties of each frame of the received frames. A method for providing adaptive interrupt coalescing is also provided.

20 Claims, 4 Drawing Sheets

300

|  | Frame Size Counter 1 | Frame Size Counter 2 | Frame Size Counter 3 | Frame Size Counter 4 | Frame Size Bracket 5 | Frame Size Bracket 6 |
|---|---|---|---|---|---|---|
| CoS 0 | Bin 0 | Bin 1 | Bin 2 | Bin 3 | Bin 4 | Bin 5 |
| CoS 1 | Bin 6 | Bin 7 | Bin 8 | Bin 9 | Bin 10 | Bin 11 |
| CoS 2 | Bin 12 | Bin 13 | Bin 14 | Bin 15 | Bin 16 | Bin 17 |
| CoS 3 | Bin 18 | Bin 19 | Bin 20 | Bin 21 | Bin 22 | Bin 23 |
| CoS 4 | Bin 24 | Bin 25 | Bin 26 | Bin 27 | Bin 28 | Bin 29 |
| CoS 5 | Bin 30 | Bin 31 | Bin 32 | Bin 33 | Bin 34 | Bin 35 |
| CoS 6 | Bin 36 | Bin 37 | Bin 38 | Bin 39 | Bin 40 | Bin 41 |
| CoS 7 | Bin 42 | Bin 43 | Bin 44 | Bin 45 | Bin 46 | Bin 47 |

|  | Frame Size Counter 1 | Frame Size Counter 2 | Frame Size Counter 3 | Frame Size Counter 4 | Frame Size Bracket 5 | Frame Size Bracket 6 |
|---|---|---|---|---|---|---|
| CoS 0 | 46,000 | 38,000 | 29,000 | 20,000 | 14,000 | 8,000 |
| CoS 1 | 54,000 | 47,000 | 39,000 | 28,000 | 21,000 | 15,000 |
| CoS 2 | 61,000 | 53,000 | 44,000 | 36,000 | 29,000 | 22,000 |
| CoS 3 | 68,000 | 59,000 | 50,000 | 43,000 | 38,000 | 31,000 |
| CoS 4 | 74,000 | 67,000 | 61,000 | 55,000 | 47,000 | 38,000 |
| CoS 5 | 82,000 | 76,000 | 68,000 | 59,000 | 51,000 | 44,000 |
| CoS 6 | 91,000 | 84,000 | 77,000 | 63,000 | 55,000 | 49,000 |
| CoS 7 | 100,000 | 88,500 | 80,500 | 71,000 | 60,000 | 53,000 |

FIG. 4

SYSTEMS AND METHODS FOR ADAPTIVE INTERRUPT COALESCING IN A CONVERGED NETWORK

BACKGROUND

1. Technical Field

The present disclosure is related to information handling systems. In particular, embodiments disclosed herein are related to data center implementation and management.

2. Discussion of Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Currently available information handling systems include individual information handling devices that can process upwards of a million frames or packets per second. In general, when a frame or packet is received by such an information handling device, a processor on the device must be interrupted in order to handle the frame or packet. When too many interrupts are received by a single information handling device, the device may be unable to do necessary application processing. This condition may be referred to as "interrupt live lock."

Certain techniques have been developed to prevent interrupt live lock from occurring. "Interrupt Coalescing" is a hardware technique that adjusts the rate at which interrupts are delivered to an information handling device so that the computing resources of the information handling device may be more effectively split between application processing and frame or packet processing. While interrupt coalescing has improved the performance of information handling systems, it has not been entirely satisfactory.

SUMMARY

An information handling system is provided herein. The information handling system includes one or more processors in communication with a network interface card. The network interface card includes one or more interfaces for receiving frames when the information handling system is coupled to an external network device. The information handling system also includes a classification matrix that is stored a memory that is in communication with the one or more processors. The classification matrix is used to generate a current interrupt throttling rate from a plurality of candidate interrupt throttling rates that are applied to the received frames according to at least two properties of each frame of the received frames.

Consistent with some embodiments, there is provided an information handling system. The information handling system includes a first network device having a first link and a second link, the first link coupling the first network device to a first network and the second link coupling the first network device to a second network. The information handling system also includes a server that has a network interface card for communication with the first network device and receiving a plurality of frames therefrom over a third link. The server includes one or more processors in communication with the network interface card and a memory with a classification matrix stored therein. The classification matrix is used to generate a current interrupt throttling rate from a plurality of interrupt throttling rates that are applied to the plurality of frames according to at least two properties of each received frame. The plurality of frames are received from both the first network and the second network, or from one, or the other.

Consistent with some embodiments, there is further provided a method for providing adaptive interrupt coalescing in a network. The method includes steps of receiving a plurality of frames from the network at a network interface controller during a preceding period and generating a current interrupt throttling rate, which is based on at least two properties of each frame of the plurality of frames. The method further includes a step of applying the current interrupt throttling rate to a subsequent plurality of frames during a current period.

These and other embodiments will be described in further detail below with respect to the following figures.

BRIEF DESCRIPTION OF THE DRAWINGS

FIG. 3 is a diagram of an exemplary classification matrix such as is used in an interrupt coalescing system according to some embodiments.

FIG. 4 is a diagram of an exemplary interrupt throttling rate matrix according to some embodiments.

Figure 1:
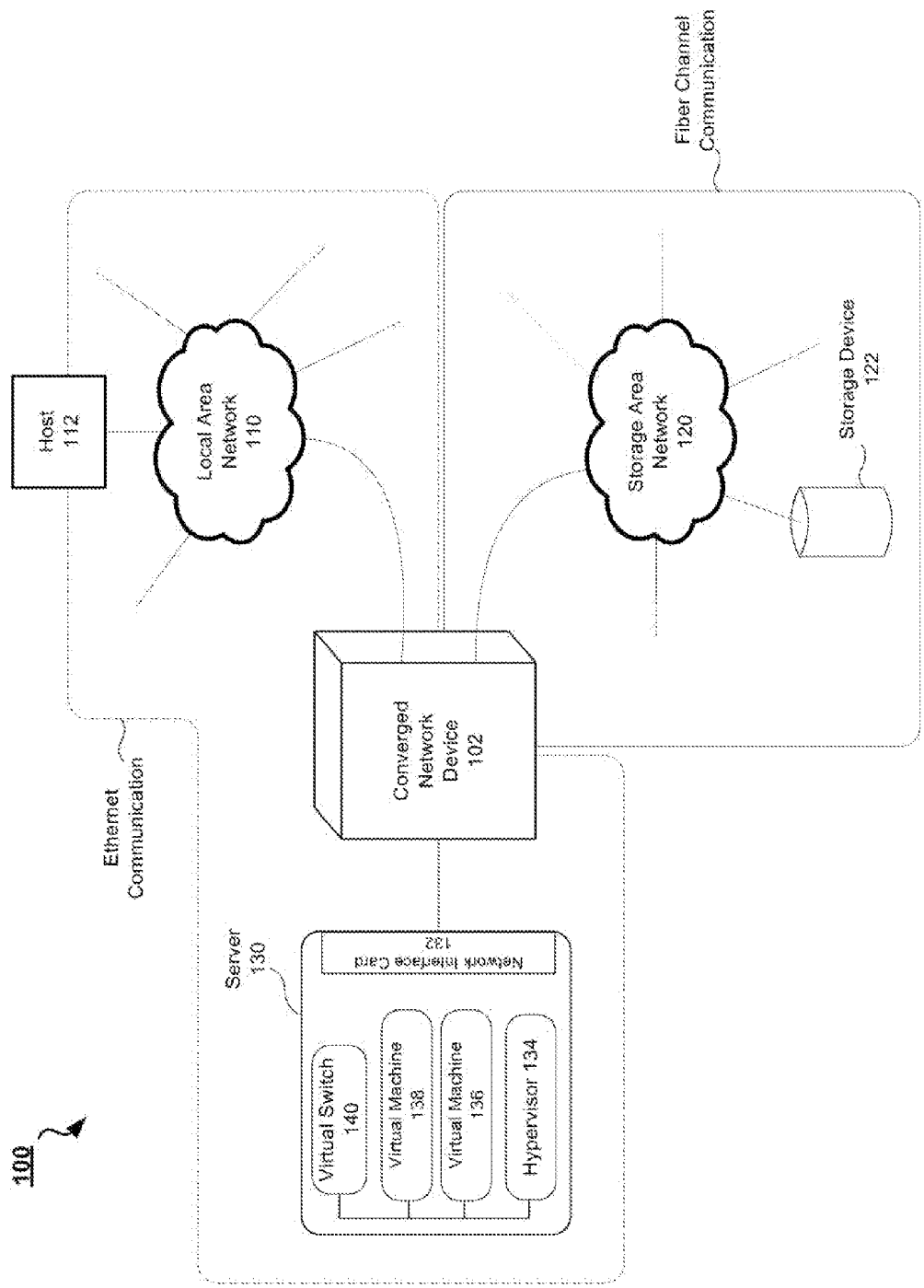
FIG. 1 is a diagram of an information handling system featuring an interrupt coalescing system according to some embodiments.

For clarity of discussion, elements having the same designation in the drawings may have the same or similar functions. The drawings may be better understood by referring to the following Detailed Description.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Additionally, some embodiments of information handling systems include tangible, non-transient, machine-readable media that include executable code that when run by a processor, may cause the processor to perform the steps of methods described herein. Some common forms of machine-readable media include, for example, floppy disk, flexible disk, hard disk, magnetic tape, any other magnetic medium, CD-ROM, any other optical medium, any other physical medium with patterns of holes or depressions, RAM, PROM, EPROM, FLASH-EPROM, any other memory chip or cartridge, and/or any other medium from which a processor or computer is adapted to read.

FIG. 1 depicts an information handling system 100 such as may be present in a network and used to provide interrupt coalescing. The information handling system 100 includes a converged network device 102 that is configured to receive communications from more than one type of network. Some embodiments of information handling system 100 may be traditional networks rather than converged networks. In such embodiments, the network device 102 is a not a converged network device. As depicted in FIG. 1, the information handling system includes a local area network 110 and a storage area network 120. While there may be many similarities between the local area network 110 and the storage area network 120, in some embodiments, the local area network 110 may be a lossy network and the storage area network 120 may be a lossless network. The local area network 110 may be an Ethernet network while the storage area network 120 may be a Fibre Channel network. In such embodiments, the converged network device 102 may include internal circuitry allowing for the reception, distribution, replication, and transmission, etc., of Ethernet frames as well as internal circuitry allowing for the reception, distribution, replication, and transmission, etc., of Fibre Channel frames.

The local area network 110 may be coupled to a plurality of additional devices such as hosts, including the depicted host 112. As an example, the host 112 may be a personal computer as may be found in a home or office. The storage area network 120 is coupled to a plurality of storage devices such as storage device 122. In general, the storage device 122 may be any device configured to store data and to interface with a storage area network. In the depicted embodiment, storage device 122 is a solid-state drive (SSD), while in others it may be a hard disk drive, a tape drive, or another storage medium.

Increasingly, information may be accessed from a host, like host 112, that may be stored, networked, and processed in a remote environment. The converged network device 102 may be configured to facilitate the retrieval and use of information stored in the storage area network 120 by a host such as host 112. In at least some circumstances, information requested by host 112 from the storage area network 120 requires processing before transmission to the host 112. Such processing may be performed by another network device coupled to the converged network device 102, such as a server 130. In many embodiments of the information handling system 100, a plurality of servers, like server 130, may be coupled to the converged network device 102. This may be the case in a data center, for example.

As depicted in FIG. 1, the server 130 communicates with the converged network device 102 through a network interface card (NIC) 132. The network interface card 132 includes a plurality of interfaces each of which may be configured to exchange information between the server 130 and the converged network device 102. Some embodiments of server 130 may include a plurality of network interface cards like the network interface card 132. The server 130 includes a hypervisor 134 that runs on one or more processors provided therein. The hypervisor 134 may be configured to allow for the instantiation and management of one or more virtual machines. As depicted, the hypervisor 134 manages a virtual machine 136 and a virtual machine 138. Virtual machines 136 and 138 may be guest operating systems each with a plurality of applications running thereon. As an example, one application running on the virtual machine 136 may process or encode video data to allow a different data rates and or resolutions of a single video file to be provided to an end user. Many more examples of data processing or other functions that may be performed by virtual machines 136 and 138 may be apparent to one of skill in the art.

While the hypervisor 134 distributes processing and memory resources among a plurality of virtual machines, the virtual switch 140, also running on server 130, may provide and distribute networking resources to each of the plurality of virtual machines. For example, when a packet or frame is received from the converged network device 102 through the network interface card 132, the virtual switch 140 directs the packet or frame to the virtual machine 138 or the virtual machine 136 according to the destination of the packet or frame.

Figure 2:
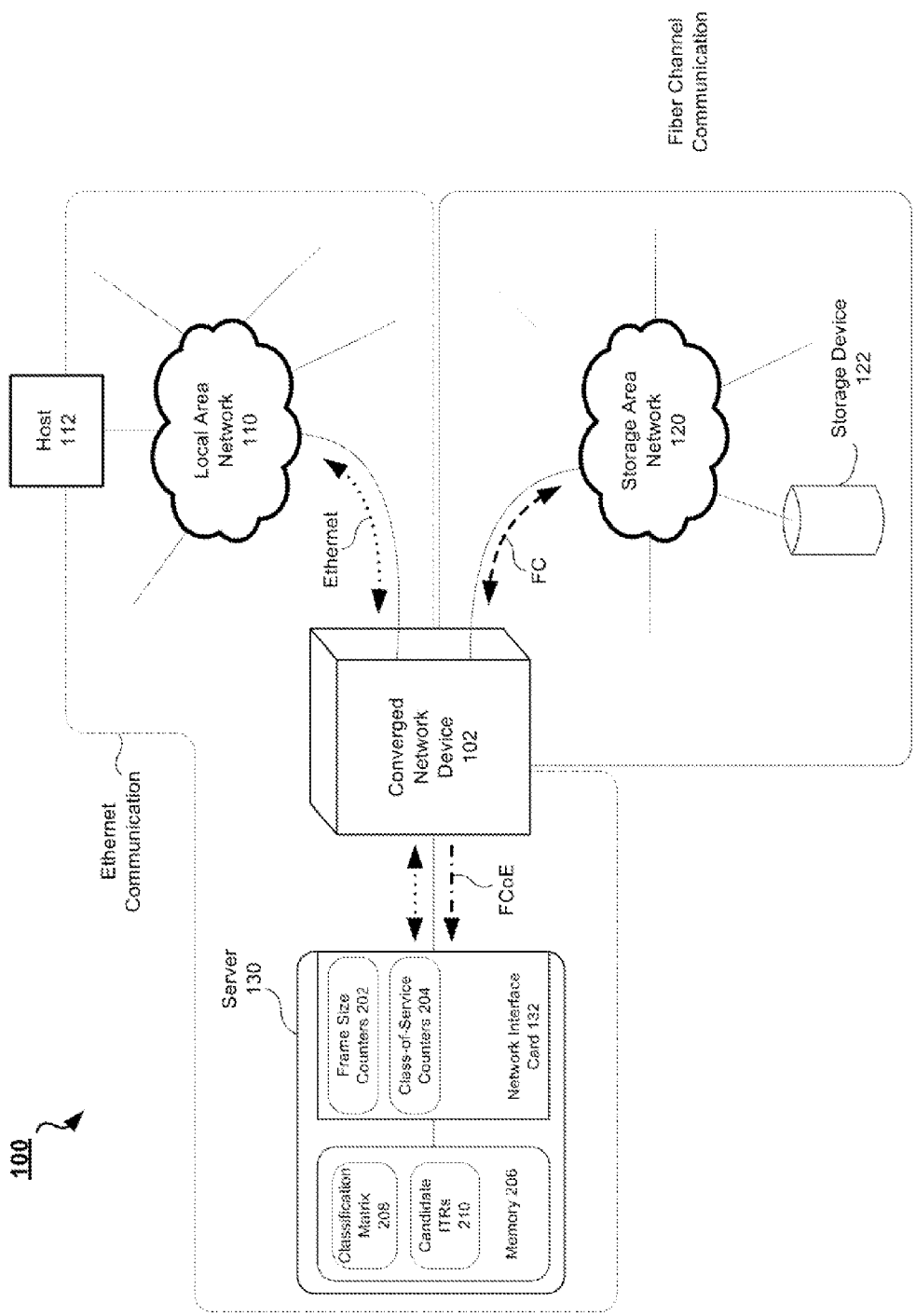
FIG. 2 is a diagram of an information handling system showing the types of traffic flowing in the system.

FIG. 2 provides further detail regarding the information handling system 100 of FIG. 1. In particular, FIG. 2 provides detail regarding the types and protocols of traffic through the depicted embodiment, as well as additional detail regarding server 130. In some embodiments, network traffic between a local area network 110 and the converged network device 102 may be transmitted according to an Ethernet protocol, illustrated as a dotted line. Traffic between the converged network device 102 and the storage area network 120 may be Fibre Channel traffic illustrated by a dashed-line. The converged network device 102 may be configured to communicate using both the Ethernet and Fibre Channel protocols and may also be configured to provide for the encapsulation of Fibre Channel frames over Ethernet networks, a technique or technology referred to as Fibre Channel over Ethernet (FCoE). FCoE provides a flow control mechanism, priority flow control, in order to mimic the lossless character of Fibre Channel communications by pausing certain classes of service as indicated by a header of a frame. Through the use of FCoE the converged network device 102 may provide data from the storage area network 120 to the server 130 for processing.

For example, a user of a video streaming service may make a request through the host 112 to access a video file stored on the storage device 122. The request may be transmitted through the local area network 110 to the converged network device 102. The converged network device 102 may request the video file through the storage area network 120. In some embodiments, the request for the video file is first transmitted from the converged network device 102 to the server 130, which then requests that the video file from the storage device 122 through the converged network device 102 and the storage area network 120. A transfer of the video file from the storage device 122 to the server 130 begins so that virtual machine 136 running on the server 130 may process the video file. For example, the user may request a video file in a specific resolution or a specific format other than that in which the video file was stored in the storage device 122. After, or as, the virtual machine 136 processes the video file, it is transferred from the server 130 to the converged network device 102 and then through the local area network 110 to reach the host 112.

During normal operations, millions of frames a second may be exchanged between the converged network device 102 and the server 130. These frames may include data and/or control frames. When a frame is received by the server 130, it is received for the network interface card 132. In some embodiments, the network interface card 132 may be configured to identify certain characteristics of the frames in order to improve the overall operation of server 130. This includes providing an interrupt throttling rate such that the network interface card 132 provides frames to one or more processors of server 130 for processing at a given rate, for example 10,000 interrupts per second. By limiting the number of interrupts received by the one or more processors, the network interface card 132 may reduce or prevent an interrupt live lock condition. Each interrupt processed consumes an amount or time of processing power. So by limiting the number of interrupts, processing resources may be spent on tasks such as format or resolution conversion of a video file, or a wide range of other processing tasks.

Using a plurality of counters, the network interface card 132 helps determine an appropriate interrupt throttling rate to apply. Because, the traffic received by server 130 is not static in kind or quantity, the appropriate interrupt throttling rate, or ITR, for one period may not be the appropriate ITR for another period. Thus, the network interface card 132 is configured to generate an interrupt throttling rate based on at least two properties of each of the frames received during a given period. The network interface card 132 includes frame size counters 202. In the depicted embodiment, frame size counters 202 include counters for each of six sizes, though some embodiments may contain more or fewer counters. Table 1 below illustrates the packet or frame sizes associated with each counter in an exemplary embodiment of frame size counters 202. Other embodiments, may include more or fewer counters with different corresponding frame sizes.

TABLE 1

| Counter Number | Corresponding Frame Size |
| --- | --- |
| Frame Size Counter 1 | 64-127 Bytes |
| Frame Size Counter 2 | 128-255 Bytes |
| Frame Size Counter 3 | 256-511 Bytes |
| Frame Size Counter 4 | 512-1499 Bytes |
| Frame Size Counter 5 | 1500-2047 Bytes |
| Frame Size Counter 6 | 2048 Bytes or more |

The network interface card 132 also includes class-of-service counters 204. As depicted, the class-of-service counters 204 include counters for eight classes of service. The header provided in tagged Ethernet frames includes a priority code point field. This three-bit field is used to indicate a frame priority level. In general, a low number is used to represent a low priority and a high number is used to represent a high priority. While the priority code point field of the frame header is used in the depicted embodiment, other quality of service mechanisms may be used as well in other embodiments.

FCoE frames are often configured with a class-of-service value, or priority code point field, set to three. However, some networks may be configured to give FCoE frames a lower or higher class-of-service value, because the Fibre Channel protocol may operate at high speeds. Additionally, Fibre Channel frames include a 2112 byte payload, classifying the frames as "jumbo frames" by Ethernet standards. Thus, FCoE frames are larger frames but require low latency. If too few frame size counters 202 or class-of-service counters 204 are used, the information handling system 100 may struggle to appropriately handle FCoE frames.

The frame size counters 202 and the class-of-service (CoS) counters 204 are configured to count each frame received of the network interface card 132 during a given period of time. Counters 202 and 204 may be reset at the end of a previous period such that they begin each period at zero. As packets are received during a period, and counters 202 and 204 count each packet according to frame size and class-of-service, the counts may be transmitted to a memory 206 of server 130. These counts are combined to form a classification matrix 208, which may be used to generate a next interrupt throttling rate to be applied such that the data for any given period is used to generate the applied ITR for the subsequent period. The memory 206 also includes a candidate ITR matrix 210 stored therein, which is discussed further below.

FIG. 3 depicts an exemplary classification matrix 300 such as may represent a single period of counter data as present in the classification matrix 208 of FIG. 2. The classification matrix 300 includes a plurality of bins, 48 bins as depicted, which are populated according to the counters 202 and 204. As an example, when the network interface card 132 receives a frame with a frame size of 256 bytes and a class-of-service value of 2, the bin 14 is incremented. As another example, when a frame of 1500 bytes is received with a class-of-service value of 1, the bin 10 is incremented. A similar process occurs hundreds of thousands, or potentially millions, of times during a single measurement period, with the corresponding bin being incremented each time.

The number of frames received in a given period depends to some extent on the length of the period. A period as described herein may last somewhere in a range from about half a second to about two seconds. For example, a one-second period may be used in the depicted embodiment such that the values depicted in each of bins 0 through 47 result from frames received during one second.

In order to generate an appropriate ITR for the server 130, a position within the classification matrix 300 is determined. This may be done by determining the class-of-service value that has the highest combined number in its row of bins, and by determining the frame size counter having the highest combined number in its column of bins. Similarly, at the end of the period the individual counter having the highest count of the class-of-service counters 204 may be identified and the individual counter having the highest count in the frame size counters 202 may be identified as well. Using these two pieces of information as indices, and without forming a full classification matrix 300, an appropriate candidate ITR may be found in an ITR matrix as will be discussed below.

FIG. 4 is an exemplary candidate ITR matrix 400 such as may be used to provide and access the candidate ITRs 210 depicted in FIG. 2. The values contained in the ITR matrix 400 are candidate ITR values. These values may be predetermined based on known qualities or aspects of the information handling device that requires interrupt throttling and then stored in memory 206 on server 130. Some specific aspects of an information handling device that may influence the candidate ITR values include a clock speed of the processors present on the information handling device, a quantity of the processing cores on the device, a cache size such as a level two or level one cache of each processor, the hyper threading capability and or availability, an amount of RAM on the system, the size of a translation lookaside buffer, and other factors. In some instances, recommended values may be provided by a manufacturer of the information handling device. While in some cases the values in the candidate ITR matrix 400 may be modified by a user or operator, in other cases they are fixed. Thus, there may be significant variation between embodiments of the candidate ITR matrix 400.

The classification matrix 300 and the candidate ITR matrix 400 may be used together in generating an appropriate ITR to be applied in a subsequent period. As discussed above, after the counters 202 and 204 have accumulated for a period, the highest counter of each property may be determined. As an example, frame size counter 5 may have the highest count among the frame size counters 202 while the class-of-service counter 6 may have the highest among the class-of-service counters 204. Using these counters as indices into the candidate ITR matrix 400 returns the candidate ITR corresponding to bin 40 of the classification matrix 300. As seen in FIG. 4, this candidate interrupt throttling rate is 55,000 interrupts per second. The classification matrix 300 is used to determine the qualities most presented by frame received during a given time period, and the candidate ITR matrix 400 is used to select the most appropriate ITR to apply during a subsequent period.

In order for the applied ITR of a system or device to adapt to changing conditions, a new ITR may be applied during each period. At the end of a period, the counters 202 and 204 are totaled and a new ITR is generated for the subsequent period. This current or applied ITR is then used by the system or device when that subsequent period, for which it was calculated, becomes the current period. In some embodiments of the information handling system 100, when a candidate ITR is identified as described above, that candidate ITR from the ITR matrix 400 is used as the applied or current ITR for the current period exactly as included in the ITR matrix 400. When that period ends, a new candidate ITR is identified from the ITR matrix 400, which is then applied during the following period.

In other embodiments of the information handling system 100, the candidate ITR as identified in the ITR matrix 400 is not applied directly by the network interface card 132. Instead, the candidate ITR is used as an intermediate value to generate the applied ITR. The candidate ITR is used as an input to a mathematical equation that combines it with one or more previously applied ITRs to calculate the applied ITR. This incorporation of previous-period applied ITRs is done in one embodiment by using an exponential smoothing algorithm as indicated in the equations below.

$$Applied\_ITR_0 = Candidate\_ITR_0 \quad (1)$$

$$Applied\_ITR_t = \alpha Candidate\_ITR_t + (1-\alpha)Applied\_ITR_{t-1}, t>0 \quad (2)$$

In equation (2), $\alpha$ represents a smoothing factor selected from a range of 0 to 1. In general, a higher value of $\alpha$ places more emphasis on the previous-period data (which by virtue of the exponential smoothing equation incorporations all previous periods), while a lower value places more emphasis on the recent period data as expressed by the candidate ITR for the period. The candidate ITR for time 0, or the initial period of operation, may be found directly from the candidate ITR matrix 400 by using a default selection or a pre-programmed selection or it may be a single pre-programmed value stored in memory. During operation, the applied ITRs for the current period (t) and the previous period (t−1) may be stored in memory. For example, this memory may be level 1 or level 2 cache of a processor running on server 130 and/or it may be stored in memory associated with the network interface card 132.

As mentioned above, while FIGS. 1 and 2 depicted a converged network device 102, other embodiments may have non-converged network devices, or network devices that are not configured to handle protocols as distinct as Ethernet and Fibre Channel. The adaptive interrupt coalescing as disclose above may be applied to information handling systems using these more traditional devices as well.

Figure 5:
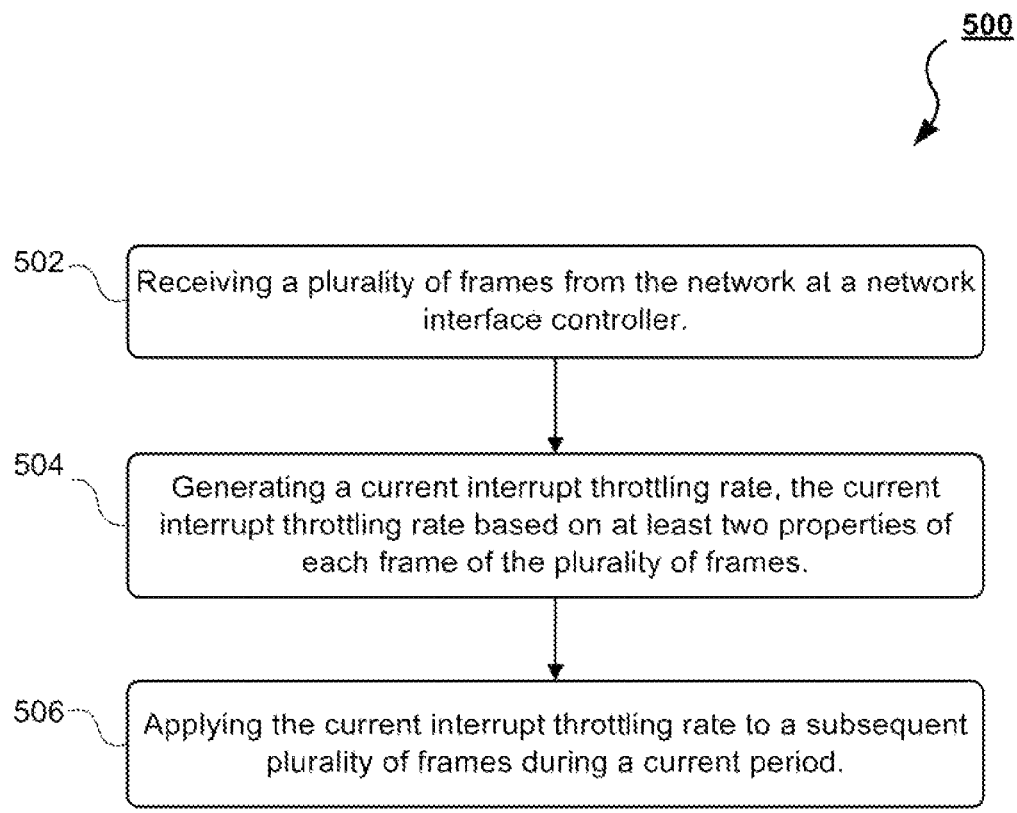
FIG. 5 is a flowchart of a method providing adaptive interrupt coalescing in a network according to some embodiments.

FIG. 5 is a method 500 for providing adaptive interrupt coalescing. The method 500 may be particularly advantageous in a converged network environment, however it may improve network performance in traditional networks as well. Method 500 includes a plurality of steps. Embodiments of the method 500 may include additional steps before, in between, and after the enumerated steps. As depicted, method 500 begins in step 502 in which an information handling device receives a plurality of frames from the network at a network interface controller. In step 504, a current ITR is generated based on at least two properties of each frame of the plurality of frames. The current ITR is applied to a subsequent plurality of frames received during a current period, in step 506.

In order to better illustrate the performance of method 500, explanatory reference will now be made to the information handling system 100 depicted in FIGS. 1 and 2 and described above. During communication that involves the transmission of data from the storage device 122 to the host 112, a large number of frames may be received by the converged network device 102 which transmits them to the server 130 for processing. The server 130 receives the plurality of frames on the network interface card 132 (step 502).

The frame size counters 202 and a class-of-service counters 204 count each frame received from the converged network device 102. The counters 204 and 202 are used to populate the classification matrix 208. The maximum count from each of the sets of counters 202 and 204 or the bin having the highest count in the classification matrix is used to determine a set of indices that are then mapped to the candidate ITR matrix 210 to select a candidate ITR. In some embodiments this candidate ITR is applied as a current ITR to incoming frames received from then on until the end of the applicable period. In other embodiments, the candidate ITR is combined in equation (2) with a previously applied ITR to calculate the current ITR (step 504), which is then applied to an incoming plurality of frames received during the commencing period (506).

Some embodiments of information handling system 100 include tangible, non-transient, machine-readable media that include executable code that when run by a processor, such the one or more processors of server 130 in FIGS. 1 and 2, may cause the processor to perform the steps of method 500 as described above. Some common forms of machine-readable media that may include the steps of method 500 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read. The machine-readable media may be memory 206 of FIG. 2.

The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. An information handling system comprising:
   one or more processors in communication with a network interface card (NIC);
   one or more interfaces for receiving frames through the NIC when the information handling system is coupled to an external network device; and
   a memory in communication with the one or more processors, the memory storing a classification matrix used to generate a current interrupt throttling rate from a plurality of candidate interrupt throttling rates that are applied to the received frames according to at least two properties of each received frame.

2. The information handling system of claim 1, wherein the at least two properties include a frame size and a class-of-service indicator.

3. The information handling system of claim 1, further comprising a plurality of counters configured to count a number of frames from the received frames that are associated with each of the plurality of candidate interrupt throttling rates, the association being based on the at least two properties.

4. The information handling system of claim 3, wherein the plurality of counters accumulate during a first period, reset at an end of the first period, and accumulate during a second period after the first period.

5. The information handling system of claim 1, wherein the current interrupt throttling rate is applied to received frames during a first period.

6. The information handling system of claim 1, wherein the current interrupt throttling rate is based in part on a previous-period interrupt throttling rate, the previous-period throttling rate being applied to the received frames during a second period, the second period preceding a first period, the current interrupt throttling rate being applied during the first period.

7. An information handling system comprising:
   a first network device having a first link and a second link, the first link coupling the first network device to a first network and the second link coupling the first network device to a second network;
   a server having a network interface card for communication with the first network device and receiving a plurality of frames therefrom over a third link, the server including:
     one or more processors in communication with the network interface card;
     a memory in communication with the one or more processors, the memory storing
   a classification matrix used to generate a current interrupt throttling rate from a plurality of interrupt throttling rates that are applied to the plurality of frames according to at least two properties of each received frame,
   wherein the memory is in communication with the one or more processors and the plurality of frames are received from both the second network and the first network.

8. The information handling system of claim 7, wherein the network interface card comprises a plurality of counters configured to count each frame of the plurality of frames according to at least two properties.

9. The information handling system of claim 7, wherein the frames of the plurality of frames that are received from the second network comprise Fibre Channel frames.

10. The information handling system of claim 7, wherein the first network comprises an Ethernet network and the second network comprises a Fibre Channel storage area network.

11. The information handling system of claim 7, wherein the classification matrix includes a set of counter data for a first period and a set of candidate interrupt throttling rates, the set of candidate interrupt throttling rates being based on one or more aspects of the server.

12. The information handling system of claim 11, wherein the one or more aspects of the server includes at least one of:
   a clock speed of the one or more processors,
   a quantity of processing cores,
   a cache size,
   a threading availability,
   an amount of random-access memory (RAM), and
   a size of a translation lookaside buffer.

13. The information handling system of claim 7, wherein an exponential smoothing algorithm is used to calculate the current interrupt throttling rate for a first period.

14. A method for providing adaptive interrupt coalescing in a network, the method comprising:
   receiving a plurality of frames from the network at a network interface controller during a first period;
   generating a current interrupt throttling rate based on at least two properties of each frame of the plurality of frames; and
   applying the current interrupt throttling rate to a subsequent plurality of frames during a second period.

15. The method of claim 14, further comprising:
   counting each frame of the plurality of frames; and
   forming a classification matrix, the classification matrix indicating a count of each frame of the plurality of frames as categorized according to the at least two properties during the first period.

16. The method of claim 14, further comprising:
   counting each frame of the plurality of frames according to a frame size; and counting each frame of the plurality of frames according to a class-of-service indicator.

17. The method of claim 15, wherein generating the current interrupt throttling rate further comprises: identifying a position of a highest count in the classification matrix; matching the position of the highest count in the classification matrix with a candidate interrupt threshold matrix to select a current candidate interrupt throttling rate.

18. The method of claim 17, wherein the current candidate interrupt throttling rate is determined by a cell of a candidate interrupt throttling rate matrix.

19. The method of claim 14, wherein in generating the current interrupt throttling rate comprises: determining a current candidate interrupt throttling rate; retrieving a previous-period interrupt throttling rate; and combining the current candidate interrupt throttling rate and the previous-period interrupt throttling rate to form the current interrupt throttling rate.

20. The method of claim 14, wherein the generating the current interrupt throttling rate comprises performing an exponential smoothing operation on a current candidate interrupt throttling rate and at least one previous-period interrupt throttling rate.

* * * * *